(12) United States Patent
Gaither

(10) Patent No.: US 10,913,360 B2
(45) Date of Patent: Feb. 9, 2021

(54) SYSTEMS AND METHODS OF AUTONOMOUS SOLAR EXPOSURE

(71) Applicant: Toyota Motor Engineering & Manufacturing North America, Inc., Plano, TX (US)

(72) Inventor: Geoffrey D. Gaither, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 346 days.

(21) Appl. No.: 15/896,004

(22) Filed: Feb. 13, 2018

(65) Prior Publication Data
US 2019/0248243 A1    Aug. 15, 2019

(51) Int. Cl.
| | |
|---|---|
| *B60L 8/00* | (2006.01) |
| *F24S 50/20* | (2018.01) |
| *B60L 58/13* | (2019.01) |
| *B60K 16/00* | (2020.01) |

(52) U.S. Cl.
CPC .............. *B60L 8/003* (2013.01); *B60L 58/13* (2019.02); *F24S 50/20* (2018.05); *B60K 2016/003* (2013.01)

(58) Field of Classification Search
CPC ............ B60L 8/003; B60L 58/13; F24S 50/20
USPC ......................................................... 701/22
See application file for complete search history.

(56) References Cited

U.S. PATENT DOCUMENTS

| | | | | |
|---|---|---|---|---|
| 8,884,784 | B2 * | 11/2014 | Kirsch ................... | G08G 1/143 |
| | | | | 340/932.2 |
| 9,679,490 | B2 * | 6/2017 | Ceribelli .............. | G05D 1/0005 |
| 2010/0169008 | A1 | 7/2010 | Niwa | |
| 2016/0207418 | A1 * | 7/2016 | Bergstrom ............... | B60G 3/08 |
| 2017/0136891 | A1 * | 5/2017 | Ricci ......................... | B60L 5/42 |
| 2017/0136892 | A1 * | 5/2017 | Ricci ....................... | B60L 53/38 |
| 2017/0136893 | A1 * | 5/2017 | Ricci ....................... | B60L 50/40 |
| 2017/0136894 | A1 * | 5/2017 | Ricci ....................... | B60L 53/36 |
| 2017/0349039 | A1 * | 12/2017 | Rayner ................. | H02J 7/0042 |
| 2017/0361726 | A1 * | 12/2017 | Widmer ................ | B60L 53/122 |
| 2018/0229613 | A1 * | 8/2018 | Rajaie ................... | B60L 11/185 |
| 2018/0304765 | A1 * | 10/2018 | Newman ................ | B60L 53/68 |
| 2019/0031039 | A1 * | 1/2019 | Wunderlich ........ | B60L 11/1842 |
| 2019/0031199 | A1 * | 1/2019 | Dudar ................... | B60W 10/30 |
| 2019/0056745 | A1 * | 2/2019 | Meehan .................... | B62J 1/12 |
| 2019/0107408 | A1 * | 4/2019 | Stroman ............ | G01C 21/3469 |

(Continued)

*Primary Examiner* — Peter D Nolan
*Assistant Examiner* — Wae L Louie
(74) *Attorney, Agent, or Firm* — Sheppard, Mullin, Richter & Hampton LLP; Hector A. Agdeppa; Daniel N. Yannuzzi

(57) ABSTRACT

Systems and methods of autonomously driving a vehicle to one or more locations, or repositioning the vehicle, to achieve optimal solar exposure are provided. Operating conditions of the vehicle, environmental conditions, as well as road conditions may be considered when determining whether or not to move, relocate, or reposition the vehicle to achieve optimal solar exposure. The optimal solar exposure is that which allows a power storage device of the vehicle to be charged to a desired state of charge. Additional considerations, such as the time needed to travel to a new location(s) and return from the location(s) in time for a next use of the vehicle, may be taken into account. Any energy expenditures that may result from traveling to/from the new location(s) may also be considered.

20 Claims, 8 Drawing Sheets

(56) References Cited

U.S. PATENT DOCUMENTS

2019/0248243 A1\* 8/2019 Gaither ................... B60L 8/003
2020/0016985 A1\* 1/2020 Sham ...................... B60L 53/60

\* cited by examiner

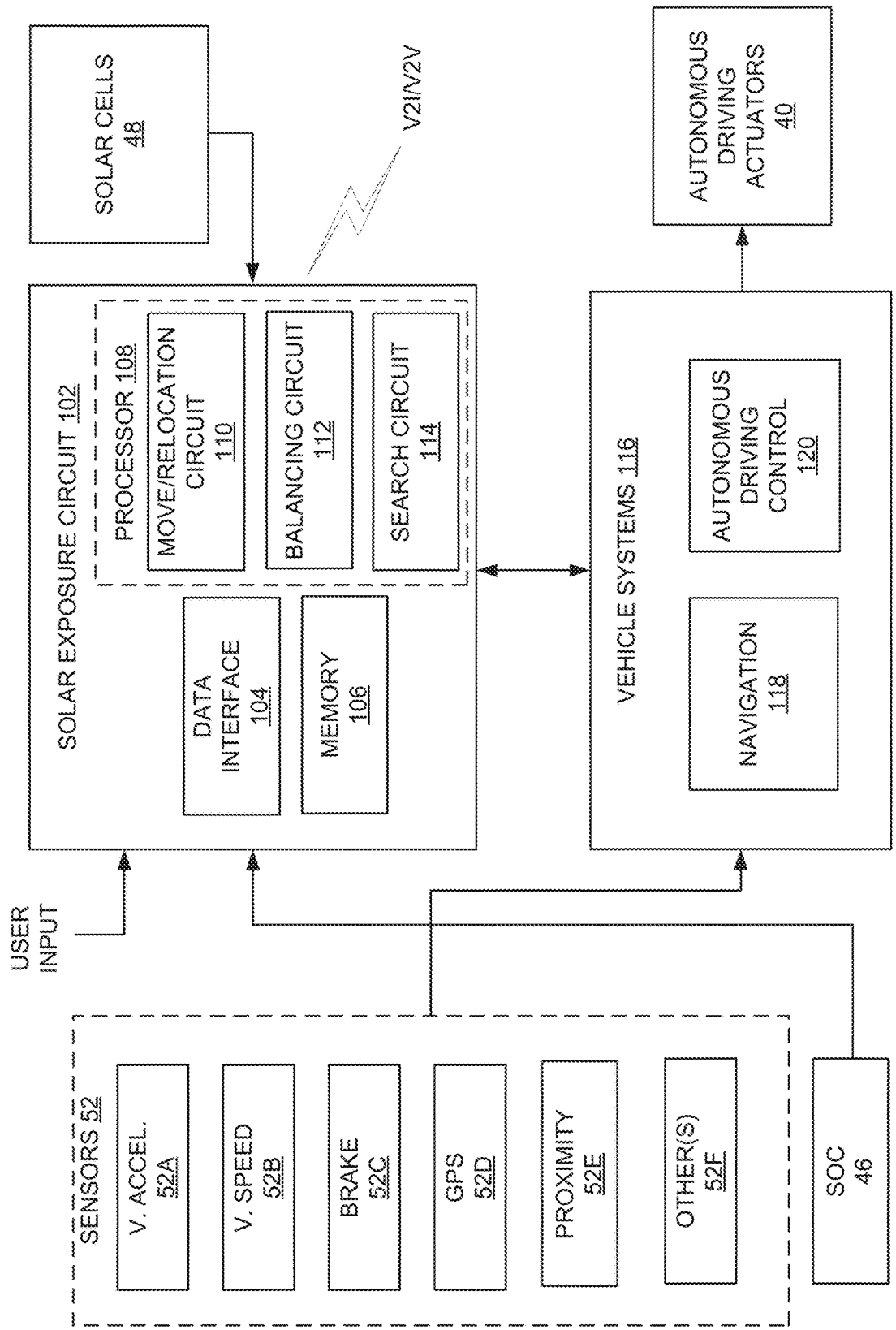

SYSTEMS AND METHODS OF AUTONOMOUS SOLAR EXPOSURE

TECHNICAL FIELD

The disclosed technology relates generally to automotive systems, and more particularly, some embodiments relate to autonomous operation of a vehicle to achieve optimal solar exposure.

DESCRIPTION OF THE RELATED ART

Some vehicle manufacturers have begun utilizing alternative power sources to improve fuel economy, as well as improve the overall operating efficiency and environmental performance of their vehicles. One such type of alternative power source is solar power. Solar power is a renewable energy source, and can be harnessed through the use of solar cells that convert light energy of the sun into electrical energy (photovoltaic power generation).

Solar cells can be incorporated into a vehicle's roof as the roof of a vehicle is an area that generally experiences the most exposure to the sun (versus, for example, the side panels/doors of the vehicle). However, even though the roof of a vehicle often experiences the greatest sun exposure, the solar power that can be captured is only capable of charging a small portion of a vehicle's power storage device (e.g., battery). In some vehicles, the power storage device can be fully recharged through solar power, but it is done at a slow rate. The operation of conventional solar roofs is further hampered by conditions that impede exposure of the solar roof to the sun, e.g., when the vehicle is parked inside a garage, when the vehicle is being operated in cloudy or less-than-ideal weather, etc.

BRIEF SUMMARY OF EMBODIMENTS

In accordance with one embodiment, a computer-implemented method, comprises determining whether a vehicle is in a parked state. Upon a determination that the vehicle is in the parked state, a first location of the vehicle may be determined. The vehicle's power storage device state of charge may be measured. Solar exposure that can be used by a solar panel of the vehicle to recharge the vehicle's power storage device to a desired state of charge relative to the measured power storage device state of charge is determined within a range of operation relative to the first location. An autonomous driving mode of the vehicle is enabled. The vehicle is autonomously operated to travel to one or more locations at which the solar exposure meets energy requirements for recharging the vehicle's power storage device to the desired SOC. The vehicle is automatically parked for a determined time period to recharge the vehicle's power storage device to the desired SOC. The vehicle may then be returned to the first location.

In some embodiments, the range of operation relative to the first location comprises a maximum, radial distance from the first location that the vehicle is allowed to be autonomously operated. The maximum, radial distance from the first location that the vehicle is allowed to be autonomously operated is user defined.

In some embodiments, the range of operation relative to the first location comprises a distance the vehicle is capable of being autonomously operated based on the vehicle's power storage device current state of charge.

In some embodiments, the range of operation relative to the first location is limited by an amount of time needed by the vehicle to travel to the one or more locations and return from the one or more locations to the first location. The amount of time needed by the vehicle to travel to the one or more locations and return from the one or more locations to the first location is less than a period of time ending when an operator or passenger of the vehicle is to return to operate the vehicle.

The method may further comprise selecting the one or more locations based on locations at which the vehicle can be automatically parked. This is to optimize the solar exposure needed to meet the energy requirements for recharging the vehicle's power storage device to the desired SOC. This also minimizes the energy required to travel to the one or more locations, and return from the one or more locations to the first location.

In some embodiments, the one or more locations are selected from a group of locations. The locations may comprise at least one of a location identified by other vehicles as potentially meeting the energy requirements for recharging the vehicle's power storage device to the desired SOC through solar exposure. The locations may comprise a solar array location potentially meeting the energy requirements for recharging the vehicle's power storage device to the desired SOC through solar exposure. The locations may comprise a location historically identified as potentially meeting the energy requirements for recharging the vehicle's power storage device to the desired SOC through solar exposure.

In some embodiments, the one or more locations are selected from a group of locations comprising locations where energy expended by the vehicle in traveling to and returning from the locations is less than the energy requirements for recharging the vehicle's power storage device to the desired SOC through solar exposure The method may further comprise determining whether to relocate the vehicle to another location from the one or more locations.

In some embodiments, determining whether to relocate the vehicle to the other location from the one or more locations comprises determining whether a solar absorption rate at the one or more locations falls below an expected threshold.

The method may further comprise repositioning the vehicle to maximize exposure of the vehicle's solar panel to a solar energy source.

In some embodiments, the repositioning of the vehicle comprises orienting the vehicle on a road grade to achieve an angular position relative to the solar energy source.

In accordance with one embodiment, a system comprises one or more sensors adapted to determine one or more operating conditions of a vehicle, and a solar panel implemented on a roof of the vehicle. The system may comprise a solar exposure circuit adapted to determine a subsequent location to which the vehicle should be autonomously moved, relocated, or repositioned from an original location at which the vehicle is parked. This is to expose the solar panel to a solar energy source such that energy is absorbed from the solar energy source at a rate and in an amount sufficient to charge a power storage device of the vehicle to a desired state of charge.

The system may further comprise a navigation system operatively connected to the solar exposure circuit, the navigation system determining a route the vehicle should travel upon being autonomously moved or relocated to the subsequent location.

In some embodiments, the solar exposure circuit determines the subsequent location based on one or more characteristics of the route and an amount of energy the vehicle will expend upon being autonomously moved or relocated to the subsequent location. The determination is made such that a net amount of energy resulting from the exposure to the solar energy source and the amount of energy the vehicle will expend meets the amount sufficient to charge the power storage device of the vehicle to the desired state of charge.

In some embodiments, the one more characteristics of the route comprise a radial distance from the original location that meets a user-input distance constraint.

In some embodiments, the one or more characteristics of the route comprise predicted weather conditions along the route.

In some embodiments, the one or more characteristics of the route comprise at least one known solar array being present on the route.

In some embodiments, the one or more characteristics of the route comprise historical identification of at least one portion of the route as having features or conditions conducive to providing the energy. The energy is absorbed from the solar energy source at a rate and in an amount sufficient to charge the power storage device of the vehicle to the desired state of charge.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 1B illustrates an example architecture for implementing autonomous solar exposure in the vehicle of FIG. 1A.

Figure 1A:
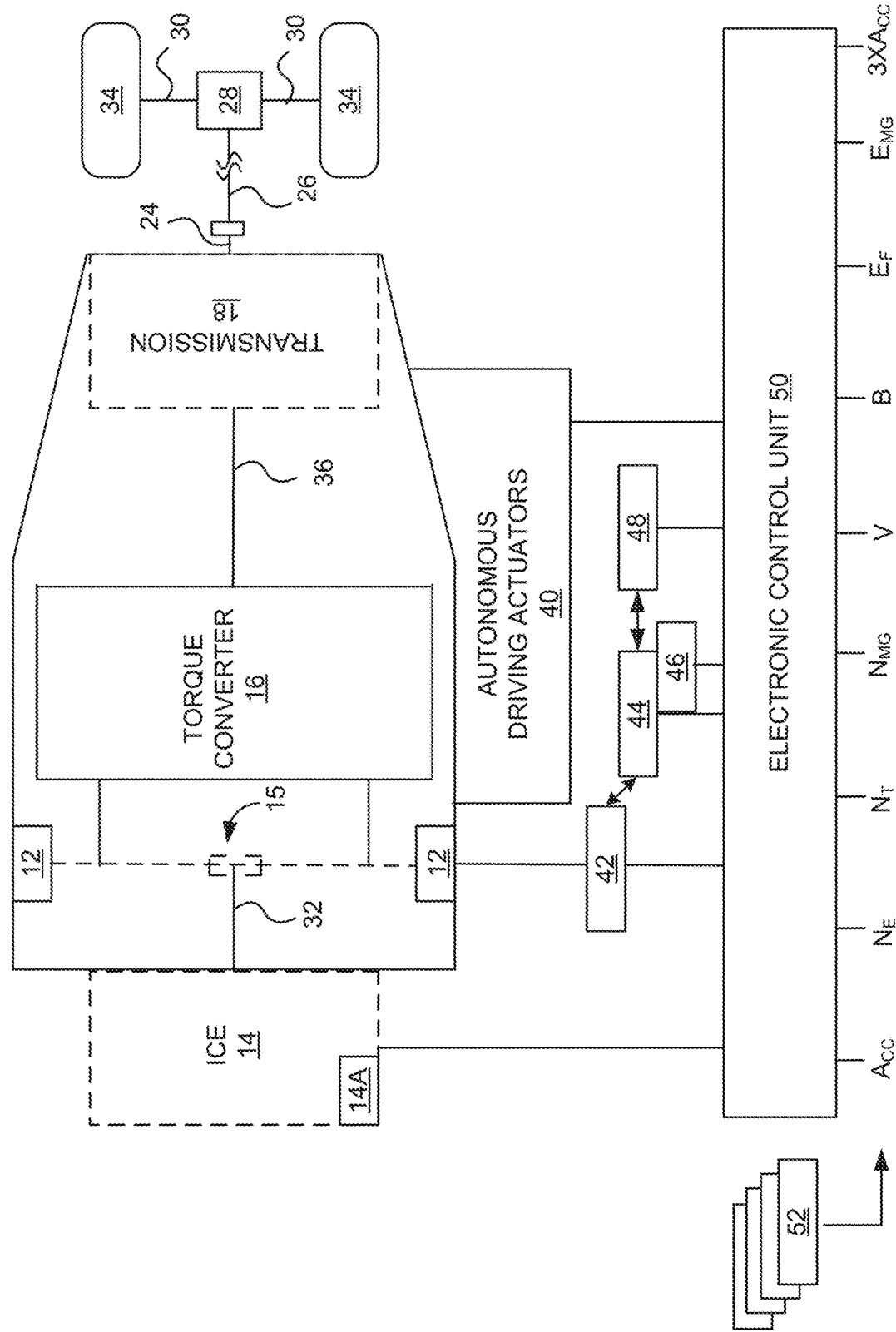
FIG. 1A illustrates an example of a vehicle with which systems and methods for autonomous solar exposure can be implemented in accordance with one embodiment of the present disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed towards systems and methods of autonomously exposing a vehicle's solar (photovoltaic) cell(s) to the sun. In particular, some embodiments are directed to leveraging autonomous driving capabilities of a vehicle in order to locate and park the vehicle in an optimal solar charging space or area. Solar cells may be located on the roof of a vehicle. The solar cells can be used to determine exposure thereof to the sun. A parking position can be located based on a position(s) of the vehicle that allows for solar exposure resulting in optimal solar/energy regeneration.

For example, a vehicle can be autonomously driven within some determined area or range relative to an original parking position and/or location in order to locate an optimal solar exposure position(s) and/or location(s). In determining a position or location for optimal solar exposure, the vehicle can consider the amount of energy being consumed during its autonomous operation as a factor for determining where/if the vehicle should move and/or relocate. It should be noted that the terms move and relocate as used herein may both refer to driving (e.g., autonomously) a vehicle to a new location. For ease of description, the term move may refer to an initial move from an original parking space, while the term relocation may refer to movement of the vehicle subsequent to the initial move. The vehicle can operate on an interval basis to account for changing conditions, e.g., sunny to cloudy. Additionally, vehicles may communicate with each other or with infrastructure to share/obtain information regarding optimal solar regeneration locations. In this way, the maximum amount of energy can be harnessed or recouped through a vehicle's solar cells. The recouped energy can be used to recharge a power storage device (e.g., battery), of the vehicle.

In a vehicle with solar cells, for example, the battery can recharged with the energy recouped by the solar cells so as to maintain the battery at an optimal state of charge (SOC). Fuel economy of the vehicle can be maximized by having the ability to use the vehicle's motor/generator (MG), which is powered by the battery, more frequently. Further still, the environmental impact of the HEV can be lessened, and the overall operating efficiency of the vehicle can be increased. In some embodiments, the recouped energy can be used to power certain systems or devices of the vehicle, e.g., the vehicle's air conditioning system. For example, using the energy recouped through the vehicle's solar cells, the vehicle's air conditioning system can be autonomously operated to gradually cool the vehicle in hotter weather. As such, an operator or passenger does not have to operate the vehicle's air condition system at a maximum level upon returning to the vehicle.

In some embodiments, a solar exposure circuit can be used to determine an area(s) where the vehicle may be moved in order to optimize solar exposure. Parameters may be set to provide operating limits, such as distance limits, maximum radius around an original parking location, time until operation of the vehicle will resume, etc. The solar exposure circuit may also perform operations to balance the energy regeneration and consumption of a vehicle. For example, optimal solar regeneration in a particular scenario may not mean maximum solar exposure, depending on a current battery SOC. The solar exposure circuit may rely on various mechanisms to determine a position/location of optimal solar exposure, e.g., the solar cells themselves, separate solar sensors, information gleaned from other vehicles, other solar facilities, etc. Based on the current operating conditions, position, and/or location of the vehicle, and the availability of solar energy, the solar exposure circuit can determine whether or not to move the vehicle from its current parking position and/or location.

In order to autonomously move or relocate, when warranted to achieve optimal solar exposure, the solar exposure circuit may operate in conjunction with one or more vehicle systems, such a navigation system and an autonomous driving control system. That is, depending on where the solar exposure circuit determines a vehicle should be moved and/or relocated, the solar exposure circuit can relay that information to a navigation system of the vehicle. A travel route can be generated based on the relayed information. The autonomous driving control system may control one or more actuators for driving the vehicle along the travel route to reach an area with optimal solar exposure. Upon reaching the area with optimal solar exposure, the vehicle's solar cells are exposed to the sun and solar energy can be harnessed and converted into electrical energy used to charge/re-charge the vehicle's power storage device and/or other vehicle systems or apparatuses. In some embodiments, the position of the vehicle may also be adjusted to achieve optimal solar exposure. The vehicle may return to its original parking location using a return travel route under autonomous driving control.

It should be noted that the terms "optimize," "optimal" and the like as used herein can be used to mean making or achieving performance as effective or perfect as possible. Moreover, techniques disclosed herein can refer to, e.g., performing calculations, etc. that result in "more accurate" determinations. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

An example vehicle in which autonomous solar exposure may be implemented is illustrated in FIG. 1A. Although the example described herein is a hybrid type of vehicle as shown in FIG. 1A, the systems and methods for autonomous solar exposure can be implemented in other types of vehicles. These other types of vehicles may include engine-only vehicles, e.g., gasoline- or diesel-powered vehicles, fuel-cell vehicles, electric vehicles, or other suitably powered vehicles. It should be understood that the amount of benefit attainable through autonomous solar exposure as disclosed herein may vary depending on what aspect(s) of a vehicle are being supplied with solar-generated power.

FIG. 1A illustrates a drive system of a vehicle 10 that may include an internal combustion engine 14 and an MG 12 as sources of motive power. Driving force generated by the internal combustion engine 14 and MG 12 can be transmitted to one or more wheels 34 via a torque converter 16, a transmission 18, a differential gear device 28, and a pair of axles 30. It should be noted that vehicle 10 may use more than one MG as a source of motive power.

As an HEV, vehicle 10 may be driven/powered with either or both of engine 14 and the MG 12 as the drive source for travel. For example, a first travel mode may be an engine-only travel mode that only uses ICE 14 as the drive source for travel. A second travel mode may be an EV travel mode that only uses MG 12 as the drive source for travel. A third travel mode may be an HEV travel mode that uses engine 14 and MG 12 as drive sources for travel. In the engine-only and HEV travel modes, vehicle 10 relies on the motive force generated at least by ICE 14, and a clutch 15 may be included to engage engine 14. In the EV travel mode, vehicle 10 is powered by the motive force generated by MG 12 while engine 14 may be stopped and clutch 15 disengaged.

Engine 14 can be an internal combustion engine such as a gasoline, diesel or similarly powered engine in which fuel is injected into and combusted in a combustion chamber. An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

MG 12 can also be used to provide motive power in vehicle 10, and is powered electrically via a power storage device 44. MG 12 can be powered by power storage device 44 to generate a motive force to move the vehicle and adjust vehicle speed. MG 12 can also function as a generator to generate electrical power such as, for example, when coasting or braking. Power storage device 44 may also be used to power other electrical or electronic systems in the vehicle. MG 12 may be connected to power storage device 44 via an inverter 42. Power storage device 44 can include, for example, one or more batteries, capacitive storage units, or other storage reservoirs suitable for storing electrical energy that can be used to power MG 12. When power storage device 44 is implemented using one or more batteries, the batteries can include, for example, nickel metal hydride batteries, lithium ion batteries, lead acid batteries, nickel cadmium batteries, lithium ion polymer batteries, and other types of batteries. An SOC sensor 46 may determine a current SOC of power storage device 44. Power storage device 44 may be recharged using energy recouped through regenerative braking by MG 12, for example, and/or through solar cells 48.

An electronic control unit 50 (described below) may be included and may control the electric drive components of the vehicle as well as other vehicle components. For example, electronic control unit 50 may control inverter 42, adjust driving current supplied to MG 12, and adjust the current received from MG 12 during regenerative coasting and breaking. As a more particular example, output torque of the MG 12 can be increased or decreased by electronic control unit 50 through the inverter 42.

A torque converter 16 can be included to control the application of power from engine 14 and MG 12 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the MG 12 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 10 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1A, electronic control unit 50 receives information from a plurality of sensors included in vehicle 10. For example, electronic control unit 50 may receive signals that indicate vehicle operating conditions or characteristics, or signals that can be used to derive vehicle operating conditions or characteristics. These may include, but are not limited to accelerator operation amount, ACC, a revolution speed, NE, of ICE 14 (engine RPM), a rotational speed, NMG, of the MG 12 (motor rotational speed), and vehicle speed, NV. These may also include torque converter 16 output, NT (e.g., output amps indicative of motor output), brake operation amount/pressure, B, SOC (i.e., the charged amount for power storage device 44 detected by SOC sensor 46). Accordingly, vehicle 10 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, EF, motor efficiency, EMG, hybrid (ICE 14+MG 12) efficiency, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity or collision sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

A further example of a sensor 52 may be a 3-axis accelerometer to detect vehicle dynamics (3XAcc). One or more 3-axis accelerometers can be used, for example, to determine acceleration of vehicle 10, as well as, for example, the vehicle attitude (i.e., roll, pitch and yaw experienced by the vehicle). In accordance with various embodiments, acceleration/deceleration information from the 3-axis accelerometers may be sent to electronic control unit 50. In this way, electronic control unit 50 may calculate acceleration, deceleration, attitude, or other vehicle parameters based on acceleration/deceleration data from the accelerometers. This rate of acceleration or deceleration can be used, for example, when determining whether to tilt or otherwise position vehicle 10 in order to receive optimal solar exposure.

Vehicle 10 may be autonomously driven or operated using autonomous driving control. Autonomous driving refers to vehicle control that causes a vehicle to travel autonomously along a target route that is set in advance. Under autonomous driving control, the vehicle travels autonomously without driver's driving operation. A target route refers to a route on a map or determined by a navigation system along which vehicle 10 will travel under autonomous driving control. Accordingly, vehicle 10 may further comprise actuators 40 that perform the driving or traveling control of vehicle 10. The actuators 40 may include, e.g., a throttle actuator, a brake actuator, and a steering actuator.

The throttle actuator controls the amount of air to be supplied to the engine (throttle angle) according to control signals from electronic control unit 50 to control the driving force of vehicle 10. Electronic control unit 50 may also transmit control signals to MG 12 that works as the source of power to control the driving force. The brake actuator controls the brake system according to control signals, received from electronic control unit 50, to control the braking force to be applied to the wheels 34 of vehicle 10. In some embodiments, a hydraulic brake system may be used. The steering actuator controls the driving of an assist motor, one component of the electric power steering system for controlling the steering torque. This can be accomplished according to control signals received from electronic control unit 50. One example of an autonomous driving control system is disclosed in U.S. Patent Publication No. 2017/0123434, the entirety of which is incorporated herein by reference. It should be noted that various types of autonomous driving control systems and methods may be used in or by vehicle 10 to control autonomous operation of vehicle 10 while searching for and moving to a location, and/or relocating vehicle 10 to attain optimal solar exposure. Those of ordinary skill in the art would understood how to implement autonomous driving control systems and methods for use in accordance with various embodiments of the present disclosure.

FIG. 1B is a diagram illustrating an example of an autonomous solar exposure system in accordance with one embodiment of the present disclosure. In this example, system 100 may include a solar exposure circuit 102, a plurality of sensors 46 and 52A-F, solar cells 48, autonomous driving actuators 40, and a plurality of vehicle systems 116. Sensors 46, 52A-F and vehicle systems 116 can communicate with solar exposure circuit 102 via a wired or wireless communication interface. Sensors 46, 52A-F and vehicle systems 116 can also communicate with each other. Solar exposure circuit 102 can be implemented as a stand-alone electronic control unit or as part of an electronic control unit such as, for example electronic control unit 50.

Figure 1C:
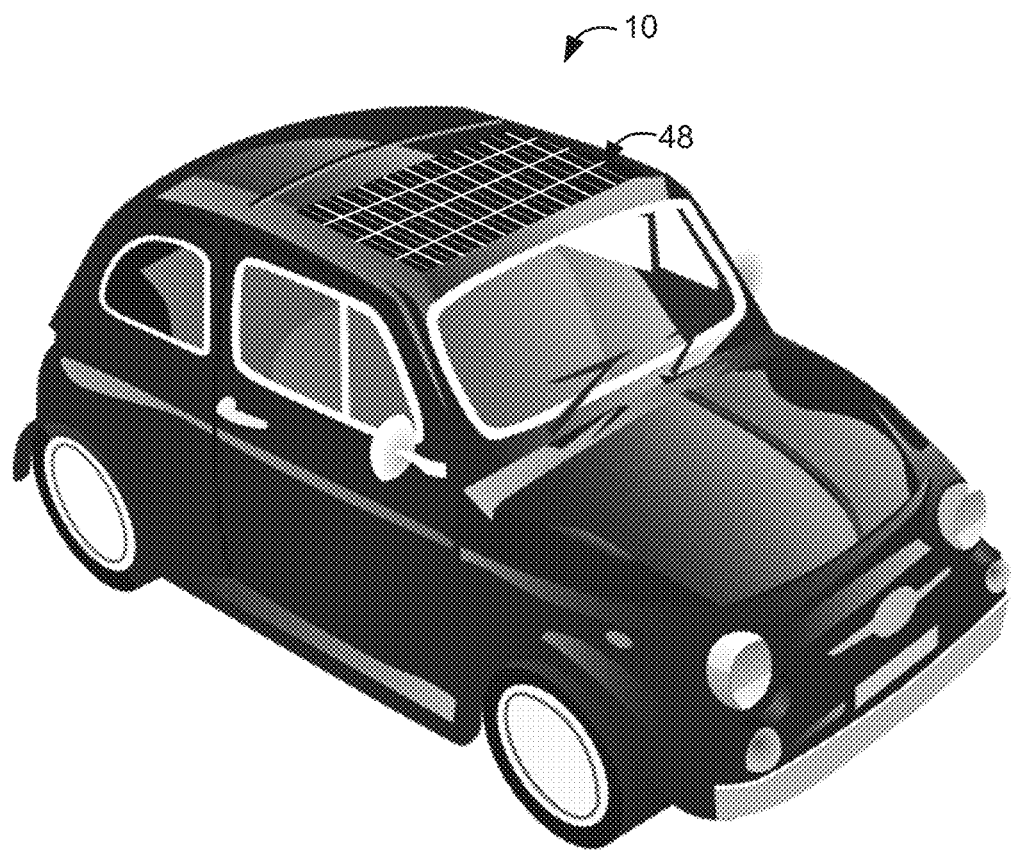
FIG. 1C illustrates an example implementation of solar cells on the vehicle of FIG. 1A.

Solar cells 48 may connected in series or parallel, and form a panel-like shape (solar panel). An example of solar cells formed in a solar panel is illustrated in FIG. 1C. FIG. 1C illustrates vehicle 10 with a roof on which solar cells 48 (configured in a solar panel) are located on the roof of vehicle 10. Solar cells 48, upon being exposed to an appropriate light source, e.g., the sun, absorb solar energy from the sun. The energy absorbed by the solar cells 48 can be converted into electrical power for powering one or more vehicle systems, apparatuses, and/or power storage devices, e.g., power storage device 44. A solar control apparatus (not shown) may convert the energy generated by solar cells 48 into electric power optimized or appropriate for the one or more vehicle systems, apparatuses, and/or power storage devices. An example of a vehicle having a solar panel for capturing solar energy and providing electrical power to the vehicle is described in U.S. Patent Publication No. 2015/0268687, which is incorporated herein by reference in its entirety. It should be noted that those of ordinary skill in the art would understand how solar cells in this or in other forms/implementations may be used to generate power for vehicle 10.

Returning to FIG. 1B, solar exposure circuit 102 in this example, includes a data interface 104, a memory 106, and a processor 108. Solar exposure circuit 102 may further include a move/relocation circuit 110, a balancing circuit 112, and a search circuit 114. Components of solar exposure circuit 102 may communicate with each other via a data bus, although other communication in interfaces can be included.

Memory 106 may include one or more various forms of memory or data storage (e.g., flash, RAM, etc.) that may be used to store the calibration parameters, images (analysis or historic), point parameters, instructions and variables for processor 106B as well as any other suitable information. Memory 106 can be made up of one or more modules of one or more different types of memory, and may be configured to store data and other information as well as operational instructions that may be used by processor 108 to control solar exposure circuit 102.

Although the example of FIG. 1B is illustrated using processor and memory circuitry, as described below with reference to circuits disclosed herein, move/relocation circuit 110, balancing circuit 112, and/or search circuit 114 can be implemented utilizing any form of circuitry. For example, this circuitry can be hardware, software, or a combination thereof. By way of further example, one or more processors, controllers, ASICs, PLAs, PALs, CPLDs, FPGAs, logical components, software routines or other mechanisms might be implemented to make up solar exposure circuit 102.

Data interface 104 can be either a wireless communications/processing interface or a wired communications/processing interface with an associated hardwired data port (not illustrated). As this example illustrates, communications with solar exposure circuit 102 can include either or both wired and wireless communications. A wireless data interface can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise.

A wired data interface can include a transmitter and a receiver (not shown) for hardwired communications with other devices, e.g., a hardwired interface to other components, including sensors 46, 52A-F, and vehicle systems 116. A wired data interface can communicate with other devices using Ethernet or any of a number of other wired communication protocols whether standardized, proprietary, open, point-to-point, networked or otherwise.

Data interface 104 can be used to transmit and receive data between solar exposure circuit 102 and sensors 46, 52A-F, as well as between solar exposure circuit 102 and vehicle systems 116. Data interface may also be used to receive sensor data from solar cells 48. That is, solar cells 48 themselves may be used in some embodiments, to determine the amount of solar exposure solar cells 48 are experiencing. This can be used to determine whether or not vehicle 10 should be moved or relocated, e.g., for a more optimal solar exposure position and/or location. Data interface 104 can also be configured to receive information or data from roadside infrastructure, other vehicles, solar farms or locations that can result in optimal/preferred solar exposure, etc. For example, data interface 104 may communicate using vehicle-to-infrastructure (V2I) or vehicle-vehicle (V2V) communications (described below). For example, data interface may communicate using other wireless, e.g., cellular, communications mechanisms or systems.

Sensors 52A-F may be example embodiments of sensors 52 illustrated in FIG. 1A. Sensors 52A-F can include one or more of the above-mentioned sensors and/or sensors capable of sensing the above-mentioned data that may be operating conditions inputs. The operating conditions inputs may be used in deciding whether or not to autonomously drive vehicle 10 to another location and/or change its position to achieve optimal solar exposure. In the case of SOC sensor 46, the charge level of power storage device 44 may be determined and communicated to solar exposure circuit 102. Solar exposure circuit 102 may make a determination as to whether or not vehicle 10 should be moved or relocated to another location and/or repositioned to achieve optimal solar exposure. For example, if SOC sensor 46 indicates that power storage device 44 is fully charged, there may not be a need to vehicle 10 to gain exposure to the sun. In some embodiments, SOC sensor 46 can continually, periodically, or aperiodically provide SOC information to solar exposure circuit 102 to allow solar exposure circuit 102 to determine a current SOC while vehicle 10 is relocating/being repositioned. It should be understood that not all the illustrated sensors are necessarily needed, and that additional sensors (other sensor(s) 52F) may be used.

In some embodiments, one or more of sensors 46 and 52A-F may be used by navigation system 118, autonomous driving control system 120, and/or autonomous driving actuators 40. For example, autonomously driving vehicle 10 to move and/or relocate to a location having optimal solar exposure may involve determining a current parking location of vehicle 10, determining a location with optimal solar exposure, and determining a travel route to reach that location. Operating conditions, e.g., SOC of power storage device 44, current charge state, specified maximum range of movement, etc. may also be considered. In some embodiments, the position of vehicle 10 relative to the sun may also be adjusted, e.g., vehicle 10 may be autonomously driven up/down an incline, angled, etc.

Accordingly, one or more of sensors 46 and 52A-F may detect operating conditions of vehicle 10. For example, SOC sensor 46 may determine a current SOC (which can also be used in conjunction with a target charge to determine charging capacity, charging status, etc. This information may be communicated to data interface 104 for storage or caching in memory 106. These operating conditions can be considered in conjunction with user input specifying, for example, move or relocation parameters (e.g., range of distance or radius from a current parking location that vehicle 10 may be autonomously driven, a time by which vehicle 10 will be needed).

In some embodiments, a GPS sensor (receiver) 52D may be used to determine the location of vehicle 10 at some point in time. For example, following the above example, GPS sensor 52D may determine a location at which vehicle 10 is currently parked. GPS sensor 52D may also track the location of vehicle 10 as it is autonomously driven pursuant to a move or relocation action to reach a location or to reposition itself to achieve optimal solar exposure. In some embodiments, GPS sensor 52D may communicate with one or more location-based systems, navigation information providers, and the like to receive location information that can ultimately be used to calculate the speed at which vehicle 10 is traveling. It should be understood that other types of sensors/receivers operable in other types or forms of positioning/location systems, e.g., GLONASS, GALILEO, BEIDOU, etc. can be used. In some embodiments, GPS sensor 52D may communicate with navigation system 118 so that navigation system 118 may determine a travel route for vehicle to follow to reach a location with optimal solar exposure. Communication with GPS sensor 52D further allows navigation system 118 to direct autonomous driving control system 120 to follow the travel route.

In still other embodiments, vehicle 10 may communicate with roadside infrastructure or units of a V2I communications system or one or more other vehicles (V2V communications) (both referred to as V2X communications) to determine and/or receive information regarding traffic, environmental, or other conditions external to vehicle 10. These V2X communications may occur between one or more roadside units and/or one or more other vehicles. They can be received directly by solar exposure circuit 102 or another electronic control unit or other communications component of vehicle 10 (and forwarded to electronic control unit 102 vis data interface 104). For example, vehicle 10 may receive information characterizing current weather conditions, upcoming road grades, traffic conditions, etc. any one or more of which may be a factor in determining optimal solar exposure for vehicle 10.

For example, current weather conditions may be used to determine a route for vehicle 10 to follow (e.g., away from cloud cover). Current weather conditions can also be used to determine that conditions within a specified move or relocation area are not conducive to solar exposure, and vehicle 10 should simply remain parked. As another example, solar farms or other areas where solar exposure is high, can communicate their location through V2I systems informing solar exposure circuit 102 of nearby locations to which vehicle 10 can be moved or relocated. For example, communications from other vehicles in proximity to vehicle 10 may inform vehicle 10 of potential locations where vehicle 10 might receive optimal solar exposure, e.g., portions of a parking structure that are exposed to the sun.

In some embodiments, an imaging sensor 52C, such as a camera, or a proximity sensor 52E (radar, lidar, etc.) may be used to determine, during a move or relocation action, whether vehicle 10 is near, approaching, or is at risk of colliding with road features, another vehicle, etc. For example, upon a determination that vehicle 10 should move, relocate, or reposition itself to achieve optimal solar exposure, autonomous driving control 120 may direct vehicle 10 in accordance with a travel route specified by navigation system 118. During an autonomous driving mode, sensors such as imaging sensor 52C and/or proximity sensor 52E may continually, periodically, or aperiodically transmit signals to notify navigation system 118 and/or autonomous driving control 120 of potential obstacles. In this way, navigation system 118 can reroute vehicle 10 to avoid the potential obstacles, and autonomous driving control 120 can direct autonomous driving actuators 40 to control throttle, braking, turning of wheels 34, etc. commensurate with the rerouting.

In some embodiments, vehicle acceleration sensor 52A, vehicle speed sensor 52B, brake sensor 52C, and/or other sensors may be used to provide feedback to autonomous driving control system 120. In this way, autonomous driving control system 120 may adjust, compensate for, or otherwise adapt operation of vehicle 10 to road conditions, environmental conditions, etc. during an autonomous driving mode. Autonomous driving control 120 may control autonomous driving actuators to operate the throttle, brakes, wheels, etc. in accordance with the feedback from the above-noted sensors. In some embodiments, SOC sensor 46 may inform solar exposure circuit 102 when power storage device 44 is fully charged. In response, solar exposure circuit 102 may instruct navigation system 118 and autonomous driving control system 120 to return vehicle 10 to its original parking location. Another sensor 52F may be a timer or clock that keeps track of time so that vehicle 10 can be returned to its original parking location by the time an operator/passenger expects to use vehicle 10.

In some embodiments, other sensors may be used to provide data that can be used in a calculation or comparison operation. For example, vehicle speed sensor 52B may be configured to determine the speed at which vehicle 10 is traveling. In some embodiments, vehicle speed sensor 52B may be sensor configured to determine the number of revolutions one or more wheels (e.g., wheels 34) are turning over some period of time. This number of revolutions may be translated into vehicle speed through one or more known calculations that may be performed on vehicle speed sensor 52B or that may be performed by processor 106B. In some embodiments, vehicle speed sensor 52B may be a radar, sonar, or other device that uses, e.g., the Doppler effect, to determine the speed at which vehicle 10 is traveling.

As alluded to above, solar exposure circuit 102 may determine whether it is appropriate for vehicle 10 to be moved, relocated, and/or repositioned to achieve optimal solar exposure for harnessing solar energy that can be used to, e.g., recharge power storage device 11. In one embodiment, information indicative of operating conditions of vehicle 10 and external or environmental conditions that impact solar exposure may be received from one or more sensors, navigation system 118, and/or solar cells 48. Based on this information, solar exposure circuit 102 can determine the appropriate action to take, e.g., move vehicle 10 from a current or original parking location to another location with better solar exposure that meets the relevant parameters and/or operating conditions. This can be accomplished by move/relocation circuit 110, where the information is received from data interface 104 and/or memory 106. Move/relocation circuit 110 perform one or more calculations, run one or more algorithms, etc. (described below) needed to effectuate the determination(s)/calculations regarding the movement, relocation, and repositioning of vehicle 10 in accordance with solar exposure needs. In some embodiments, move/relocation circuit 110 may determine the minimum amount of autonomous driving needed by vehicle 10 to achieve optimal solar exposure. In this way, obtaining optimal solar exposure does not negatively impact fuel economy, energy efficiency, and overall operating efficiency of vehicle 10.

Move/relocation circuit 110 may further make determinations and/or calculations regarding optimal solar exposure, such as whether or not current conditions meet, fall below, or exceed certain thresholds. For example, move/relocation circuit 110 may determine where the solar absorption rate measured at solar cells 48 has fallen below a given threshold or if it is below an expected threshold. In this way, move/relocation circuit 110 can determine whether vehicle 10 should be moved/relocated/repositioned to achieve optimal solar exposure. In some embodiments, move/relocation circuit 110 may determine whether or not better (e.g., higher) solar absorption rates can be achieved elsewhere, as well as whether the power storage device 44 has been charged to the desired level.

Balancing circuit 112 may determine or calculate the need for energy (that can be provided through solar exposure) and the expenditure of energy to achieve that solar exposure. In this way, obtaining optimal solar exposure does not negatively impact fuel economy, energy efficiency, and overall operating efficiency of vehicle 10. Like move/relocation circuit 110, balancing circuit 112 may receive or obtain information from one or more sensors 46 and/or 52, navigation system 116, external information providers, such as roadside units, other vehicles, solar farms/solar arrays, etc. This information can be received from memory 106 and/or data interface 104.

In some embodiments, balancing circuit 112 may determine or calculate a current energy absorption rate, and compare that to a maximum possible rate of energy absorption. This can be used to determine the amount of energy that needs to be captured to satisfy the operating conditions of vehicle 10. Balancing circuit 112 may further check current weather status within a determined move or relocation area. Balancing circuit 112 may pre-check actual conditions by "peaking out," e.g., making a minimal move to ascertain current solar conditions. For example, vehicle 10 may move out from under a parking structure or overhead obstruction such that its solar cells 48 and/or other sensor(s) achieve exposure to gauge current solar conditions. Balancing circuit 112 may determine what neighboring or other vehicles, as well as, solar arrays or other information sources are reporting in terms of solar exposure, current charge status, time until vehicle 10 is to be used again. In some embodiments, this time may be set by an operator or passenger. In other embodiments, this time may be predicted based on historical driving records or a historical or learned driver profile, based on communicating with an operator's or passenger's personal mobile device, etc. For example, data interface may communicate with the smartphone of the operator of vehicle 10 to obtain the operator's schedule (from a calendar or other scheduling application/mechanism). From this information, balancing circuit 112 can determine a next time that vehicle 10 may need to be used by the operator. This may further involve communicating with navigation system 118, e.g., to determine a travel route to the operator's next destination, and the time it will take to reach that destination. Further still, balancing circuit 112 may estimate the driving energy or power needed to reach a move or relocation area or the range limit associated with the move or relocation area.

Search circuit 114 may be used to determine an area(s) to which vehicle 10 may be moved or relocated. Additionally, search circuit 114 may be used to determine a position in which vehicle 10 should be placed to achieve optimal solar exposure. For example, at certain times of the day, or given certain weather conditions, characteristics of a structure, such as a parking garage where vehicle 10 is located, etc., solar cells 48 should be angled or tilted to achieve optimal solar exposure. For example, later in the day, when the sun is lower in the horizon, solar cells 48 (on top of vehicle 10's roof) may need to be titled such that they achieve maximum solar absorption. Accordingly, search circuit may determine at optimal angle at which vehicle 10 should be positioned relative to the sun. Search circuit 114 may communicate this information to navigation system 118. Navigation system 118 may search known locations/maps for road grades, structures, etc. that will result in the requisite angle/tilt when vehicle 10 is parked on the road grade, structure, etc.

Moreover, in some embodiments, search circuit 112 may determine an area(s) requiring the least amount of energy to reach and/or return from. Search circuit 112 may receive information from one or more of sensors 52 and/or solar cells 48 in real or near real-time to determine a current energy absorption rate in order to maximize or optimize solar absorption. That is, without up-to-date feedback, conditions may change that render the solar exposure or absorption at a particular location or in a particular position that is no longer optimal. Search circuit 114, like balancing circuit 112 may also receive V2X communications/reports from roadside infrastructure, solar farms/arrays, other vehicles, and the like.

In some embodiments, optimal solar exposure can be achieved while vehicle 10 is traveling under "normal" driving circumstances, e.g., not in the context of autonomously driving vehicle 10 after being parked. That is, vehicle 10 can be charged by solar cells 48 during regular driving, as vehicle 10 moves along in its travels. Solar cells 48 will be exposed to solar loads which can be used regardless of any autonomous relocation/charging. This charging may be enough to fully charge power storage device 44 while in motion, and vehicle 10 may not need additional charging from a solar load/source. Moreover, a path being traversed by vehicle 10 might also be the best possible location to solar charge.

Figure 2:
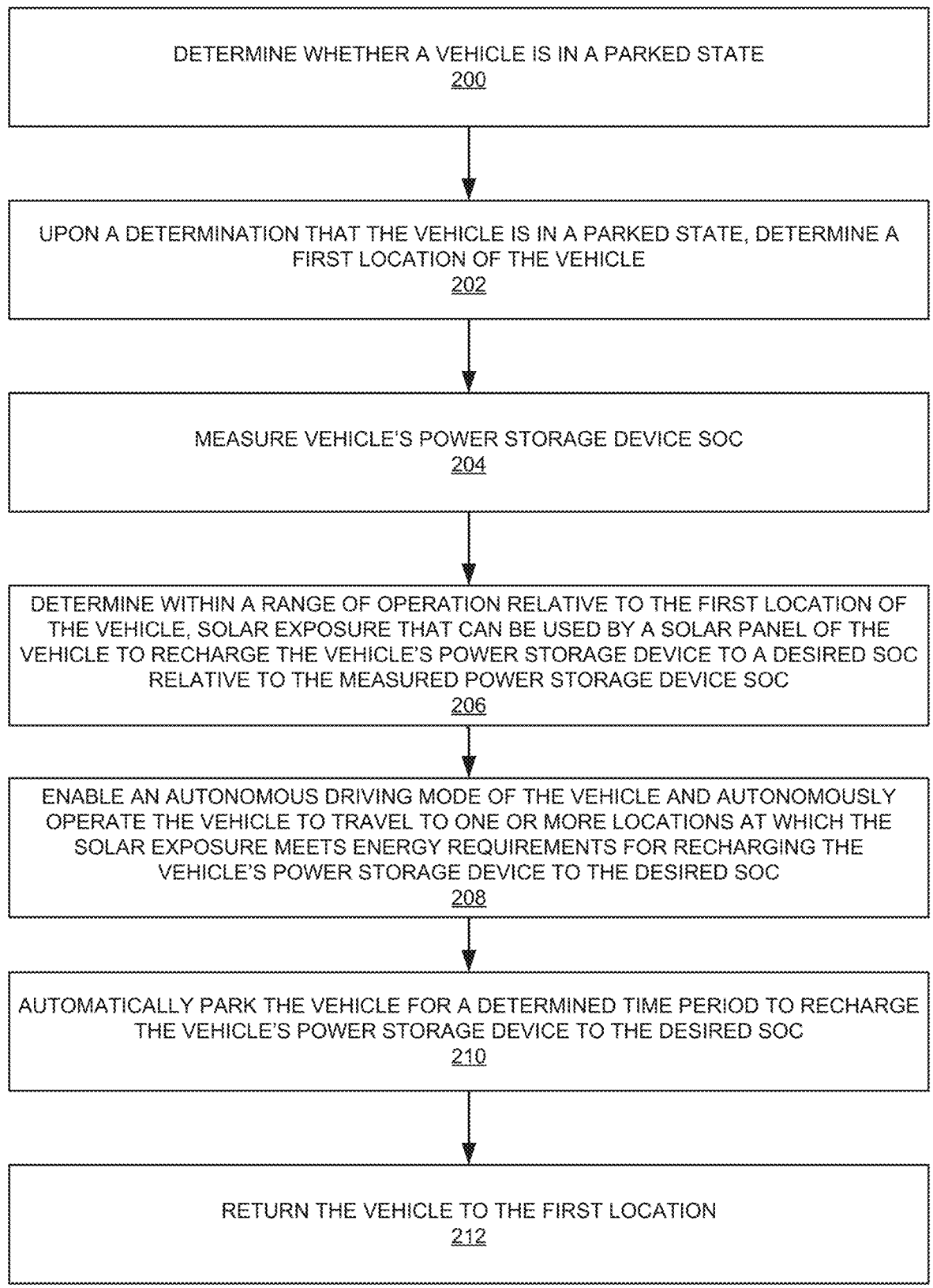
FIG. 2 is a flow chart of example operations that can be performed to autonomously control a vehicle to achieve maximum solar exposure in accordance with one embodiment.

FIG. 2 is a flow chart illustrating example operations that can be performed in order to locate and/or position a vehicle in such a way that optimal solar exposure is achieved. At operation 200, a determination is made as to whether or not a vehicle is in a parked state. One or more of sensors 52 and/or navigation system 118 may determine whether the vehicle is parked. For example, after a certain period of time has passed without energy expenditure or changing location, it may be determined that the vehicle is in a parked state. As noted above, a scenario in which achieving optimal solar exposure can be used in when a driver or operator of a vehicle has parked the vehicle. In this way, the driver or operator can leave the vehicle to be autonomously operated and absorb solar energy for power or charging one or more elements of the vehicle, e.g., the vehicle's power storage device. It should be understood that the driver need not actually leave the vehicle. That is, the vehicle can simply be put into an autonomous driving mode to be moved, relocated, or repositioned for optimal solar exposure. It should also be understood that optimal solar exposure need not necessarily refer to maximum solar exposure, although in some instances, it can. For example, as will be described below, an optimal amount of solar exposure may be some amount to bring a partially charged power storage device to some given SOC. Maximum solar exposure can lead to heating the interior of the vehicle, which the driver may need to counteract by using the vehicle's air conditioning system upon his/her return. If the interior of the vehicle is heated to a high enough temperature, the energy expended in running the air conditioning system may negate the energy recouped through solar absorption.

At operation 202, upon a determination that the vehicle is in a parked state, a first location of the vehicle is determined. This first location of the vehicle can be determined by, e.g., navigation system 118 and/or GPS sensor 52D, to provide a reference point from which the search for optimal solar exposure can begin. That is, the driver may input one or more parameters regarding how far he/she would like to limit the vehicle's travel in the autonomous driving mode, e.g., a 200 foot radius from a current parking location, i.e., the first location. The first location can be a point from which the travel limitations are measured or calculated. Moreover, the first location can be used as a starting point from which any travel routes to a new location can be determined. The first location can also be determined and recorded or stored so as to provide a return point for the vehicle.

At operation 204, the vehicle's power storage device, e.g., battery, SOC is measured, e.g., by SOC sensor 46. In this way, the amount of energy that is needed to achieve the optimal SOC can be calculated. For example, the first location (determined in operation 202) may be a waypoint along a travel route input by the driver of the vehicle. The vehicle's navigation system, aware of upcoming road conditions, travel conditions, routes to traverse, etc. may determine that the power storage device should be charged to a particular SOC upon resuming travel.

At operation 206, within a range of operation of the vehicle relative to the first location, an amount of solar exposure that can be used by a solar panel of the vehicle to recharge the vehicle's power storage device to a desired SOC relative to the measured power storage device SOC is determined. For example, balancing circuit 112 may subtract the current SOC level from the optimal SOC level to arrive at the amount of energy that would be needed to charge the vehicle's power storage device. Based on this calculation, the amount of solar absorption (and in some embodiments, the rate at which solar absorption should occur) can be determined. Furthermore, based on the range limits or parameters set forth, e.g., by the driver, one or more areas or locations to which the vehicle may autonomously travel are determined. As noted above, a variety of factors and types of information may be used to determine such areas or locations. For example, current weather conditions, road conditions, structural features or obstacles, etc. may be considered by search circuit 114 in determining areas or locations meeting the optimal solar exposure requirements of the vehicle. Move/relocation circuit 110 may also rely on these factors, information, and operating conditions of the vehicle in order to determine where the vehicle can be autonomously driven to. That is, searching circuit 114 may provide a list of potential areas or locations that are capable of meeting the solar absorption needs of the vehicle. Move/relocation circuit 110 can determine the area(s) or location (s) best suited to meet the solar absorption needs while meeting movement/relocation parameters or limits while minimizing energy expenditures to reach that area(s) or location(s).

At operation 208, an autonomous driving mode of the vehicle is enabled, and the vehicle is autonomously operated to travel to one or more locations at which the solar exposure meets the energy requirements for recharging the vehicle's power storage device to the desired SOC. Autonomous operation of the vehicle can be performed by autonomous driving control system 120 in conjunction with autonomous driving actuators 40 and navigation system 118. As alluded to above, navigation system 118 may generate a travel route, e.g., within a desired radius from the first location, to one or more appropriate areas or locations to achieve optimal solar exposure. It should be noted that the processes for measuring the vehicle's power storage device SOC, and determining areas or locations to which the vehicle may travel can be repeated as needed, and the vehicle can be relocated as necessary. That is, movement or relocation to a particular area may not satisfy the solar exposure needs, and thus, the vehicle may have to move or reposition itself multiple times. This can be done so long as the distance limitations and/or time limitations described above can be met. For example, balancing circuit 114 and move/relocation circuit 110 may determine that the vehicle should be moved/relocated to several areas within the time by which the vehicle needs to be returned to the first location.

Once the vehicle reaches a desired area or location, the vehicle is automatically parked for a determined time period during which the desired solar absorption is met at operation 210. In the event that the vehicle must travel to multiple locations to achieve the desired solar absorption/exposure the times of exposure can be calculated relative to the amount of solar exposure expected at each location by, e.g., move/relocation circuit 110 and balancing circuit 114. It should be understood that as used herein, solar absorption and solar exposure are, for practical purposes, equivalent. That is, the amount of solar energy that is absorbed is a linear function of the amount of exposure to a solar source that is experienced by solar panels/cells. However, it should be understood that the amount of energy absorption may not necessarily be linearly related to solar exposure. For example, certain vehicle operating conditions such the temperature of power storage device 44 being in an overheat condition, may not "accept" the solar energy absorbed due to solar exposure. In other words, if power storage device 44 is operating in excessively hot conditions, charging of power storage device 44 may be prohibited.

At operation 212, the vehicle is returned to the first location. Again, autonomous driving control system 120, in conjunction with navigation system 118 and autonomous driving actuators 40 can effectuate the vehicle's return. For example, navigation system 118 may record the travel route to the one or more areas or locations that the vehicle is autonomously driven. Navigation system 118 may generate a return route used to guide autonomous driving control system 120 in autonomously driving the vehicle back to the first location.

Figure 3A:
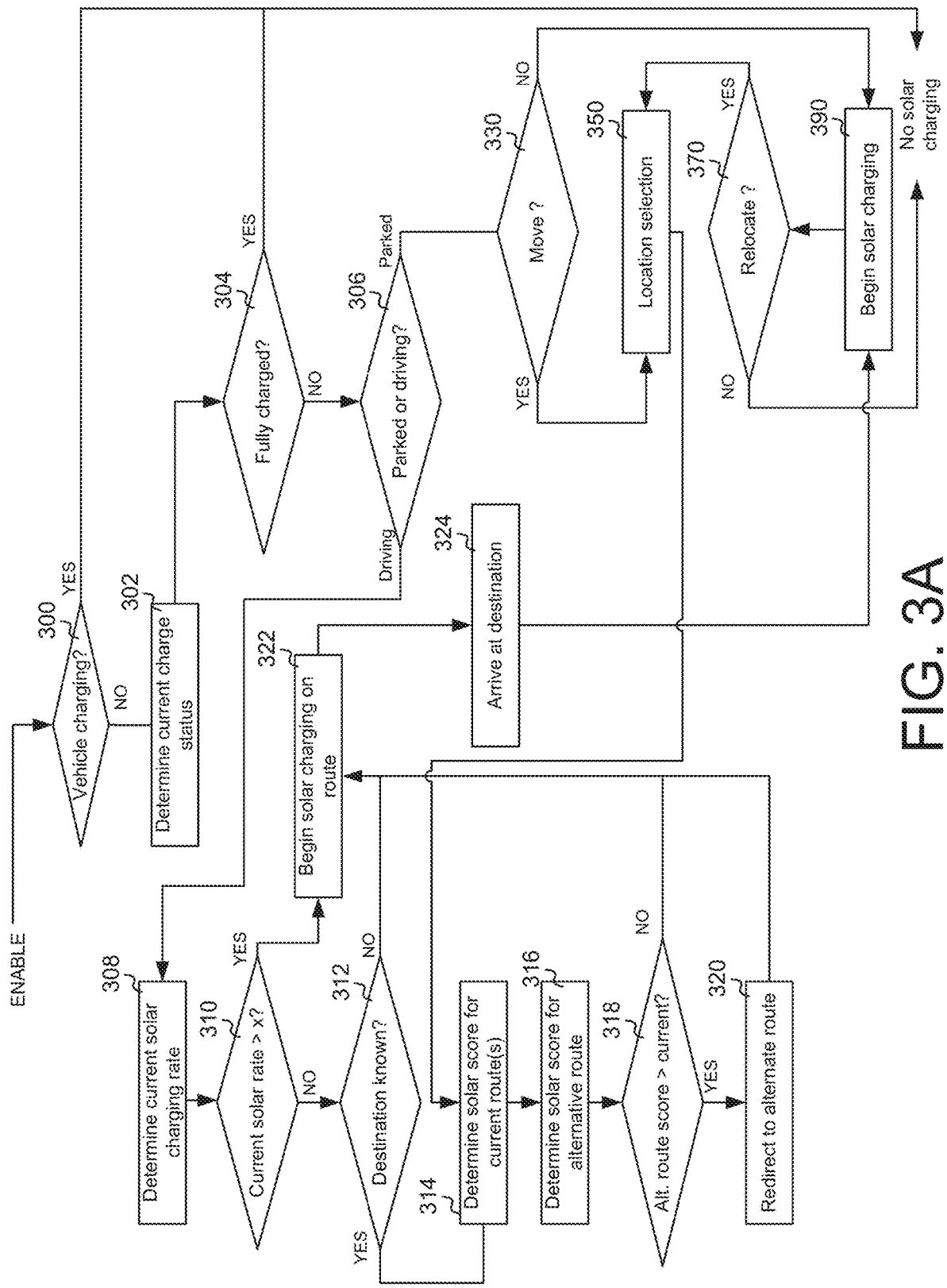
FIG. 3A is a flow chart of example operations that can be performed to implement autonomous solar exposure of a vehicle in accordance with one embodiment.

FIG. 3A is a flow chart illustrating example operations that can be performed to achieve optimal solar exposure for a vehicle in accordance with one embodiment of the present disclosure. Solar exposure circuit 102, as well as navigation system 118 and autonomous driving control system 120 may perform these operations.

In particular, a check is performed at operation 300 to determine if a vehicle, e.g., vehicle 10 (FIG. 1A) is currently charging. For example, as an EV or HEV, vehicle 10 may be connected to charging station in order to charge vehicle 10's power storage device 44. If the vehicle is charging, charging can be continued. That is, there is no need to perform solar charging.

If the vehicle is not charging, at operation 302, a current charge state is determined. That is, that SOC of the vehicle's power storage device, e.g., power storage device 44 of vehicle 10 is determined. At operation 304, a check is performed to determine if the vehicle is fully charged. If so, again, there is no solar charging needed. If the vehicle is not fully charged, a check is performed at operation 306 to determine if the vehicle is parked or if it is being driven.

If the vehicle is being driven, a current solar charging rate is determined at operation 308. That is, solar cells 48 may be monitored to determine how much energy is being absorbed over a given period of time. At operation 310, a check is performed to determine if the current solar charging rate is greater than a minimum solar charging rate threshold to consider re-routing the vehicle to achieve a better solar charging rate. The minimum solar charging rate threshold may be determined, e.g., by the manufacturer of the vehicle based on testing done to determine how the solar charging rate impacts operation, efficiency, and fuel economy of the vehicle.

If the current solar charging rate is less than the minimum to consider re-routing of the vehicle, at operation 312, a check is performed to determine if a destination is known. If a destination is not known, solar charging can begin at operation 322. This can be considered a default operation so that the vehicle can recoup whatever solar energy is available, even if not optimal.

If a destination is known, at operation 314, a "solar score" associated with a current route is determined. That is, the amount of solar exposure that can potentially be achieved along an alternative route(s) is determined or calculated. Solar exposure circuit 102, in conjunction with navigation system 118 and/or information received from other vehicles, solar array locations, etc. vis-à-vis V2X or other communications methods, can be used to determine the solar score. Information from the above-noted sources, current weather conditions, traffic conditions, road conditions of one or more sections of the route, estimated driving time, etc. can be used to predict the amount of solar exposure that can potentially be achieved. This can be translated into a score, value, or other indicia representative of the current route's potential for solar exposure.

At operation 316, one or more alternative route(s) are determined that reach the known destination, and a solar score is assigned to each of the one or more alternative routes. That is, the amount of solar exposure that can potentially be achieved along an alternative route(s) is determined or calculated. Again, information from the above-noted sources, current weather conditions, etc. can be used to predict the amount of solar exposure that can potentially be achieved. For example, based on the known destination, navigation system 118 may calculate one or more routes that reach the known destination. Information regarding weather along the one or more routes, whether or not any solar farms or arrays are located along any one of the one or more routes is considered by search circuit 114 and associated with a corresponding route. It should be understood that different methods of calculating a solar score may be used. Weighting can be applied to different factors, e.g., the potential rate of solar absorption can be used to favor a particular route over another (that while ultimately providing the same solar exposure, might result in more energy expenditures to traverse the route). That is, traffic or other considerations can be taken into account that may negatively impact solar exposure overall.

At operation 318, the solar score of the current route is compared to that of the alternative route(s). If the solar score of any one of the alternative routes is greater than that of the current route, at operation 320, the vehicle is re-routed to follow the alternative route. That is, navigation system 118 may adjust its current route to direct the driver of the vehicle to follow another route. In the event more than one alternative route has the potential to deliver better solar exposure, the one with the highest solar score can be presented to the driver via navigation system 118. Alternatively, all the routes that have the potential to deliver better solar exposure can be presented to the driver, and the driver may select one to follow, at which point navigation system 118 adjusts its current travel route.

If the current route has the potential to deliver better solar exposure, solar charging can begin at operation 322. If the current solar charging rate exceeds the minimum solar charging rate threshold, solar charging can begin while the vehicle is traversing its current route at operation 322.

At operation 324, upon arrival at the destination, it can be assumed that the power storage device of the vehicle has been depleted. Accordingly, at operation 390, solar charging can begin at (based on determinations regarding the moving/relocation/repositioning of the vehicle discussed below).

Returning to operation 306, if the vehicle is parked, a judgment can be made at 330 to move or stay in a current parked location. If the vehicle is determined to have optimal or better solar exposure by remaining in the current parked location (or in its current position), solar charging can being at operation 390. Otherwise, at operation 370, location selection is performed, e.g., by search circuit 114. Location selection can involve operations 314-322 to determine a location (or position) for optimal solar exposure. If at some point after beginning solar charging at operation 390, it is determined that the vehicle should be relocated, a relocation judgment is made at operation 370. The illustrated method may the proceed back to location selection at operation 350 to begin the process of determining a suitable location for optimal solar exposure.

Figure 3B:
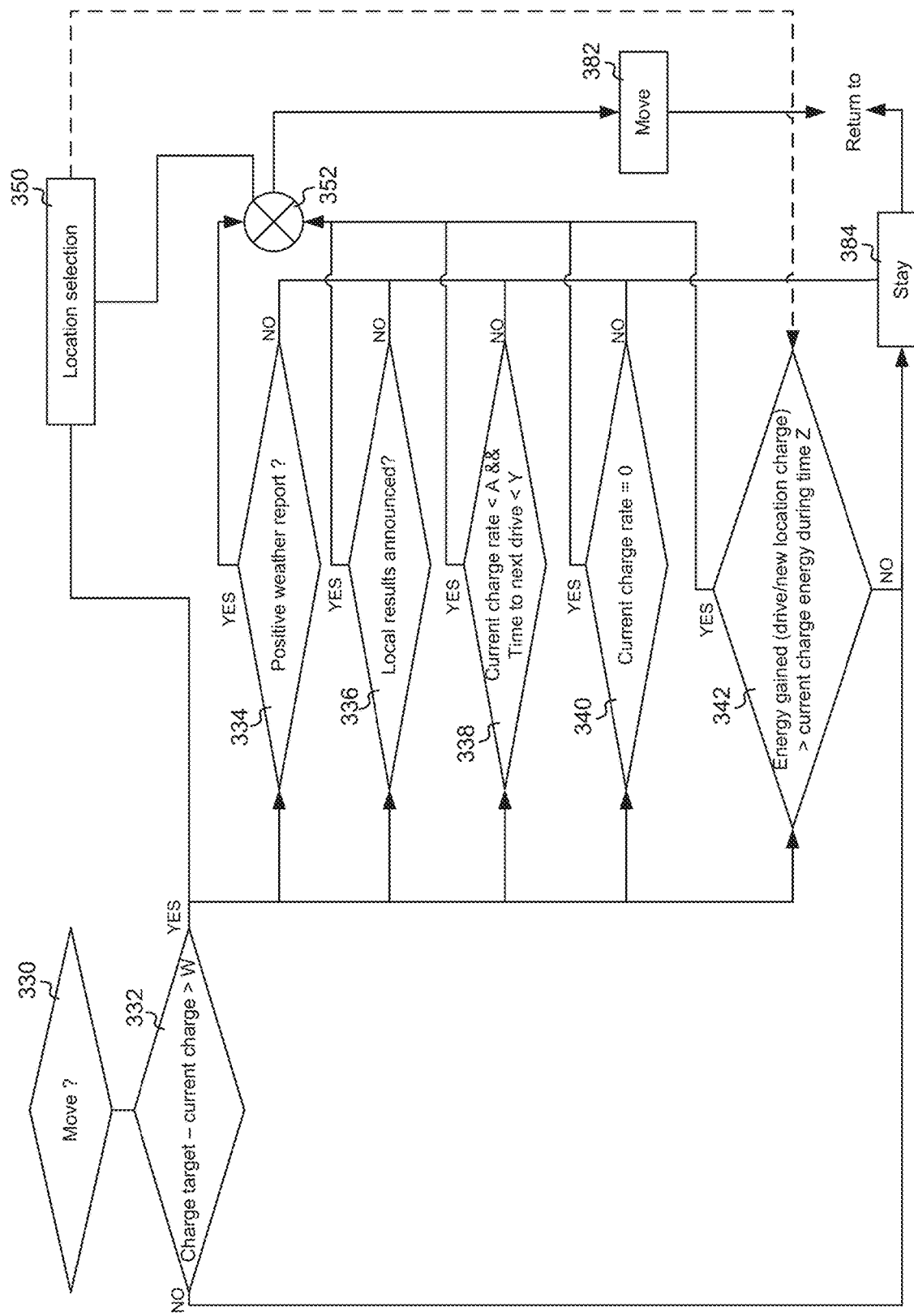
FIG. 3B is a flow chart of example operations that can be performed to determine whether or not a vehicle should be moved during the autonomous solar exposure mode of operation of FIG. 3A.

FIG. 3B illustrates example operations that detail the move judgment at operation 330. In particular, the move (or stay) judgment can be made by determining, at operation 332, if the charge target (the amount of charge desired for the vehicle's power storage device) minus the current SOC is greater than the minimum solar charging rate threshold, W. If so, different external and operating conditions and/or factors may be considered.

At operation 334, a determination is made regarding the weather. That is, a determination is made regarding whether or not the current weather conditions are conducive to achieving optimal solar exposure. If so, this may be considered as a factor in determining where to move the vehicle.

At operation 336, a determination is made regarding whether local results are announced. The announcement of local results can refer to one or more vehicles in a network announcing to each other, respective current solar charging rates. A vehicle may obtain/request current solar charting rates using V2X, cellular communications, and other communications mechanisms or methods that allow such information to be obtained/requested. If so, this may be considered as a factor in determining where to move the vehicle.

Figure 3C:
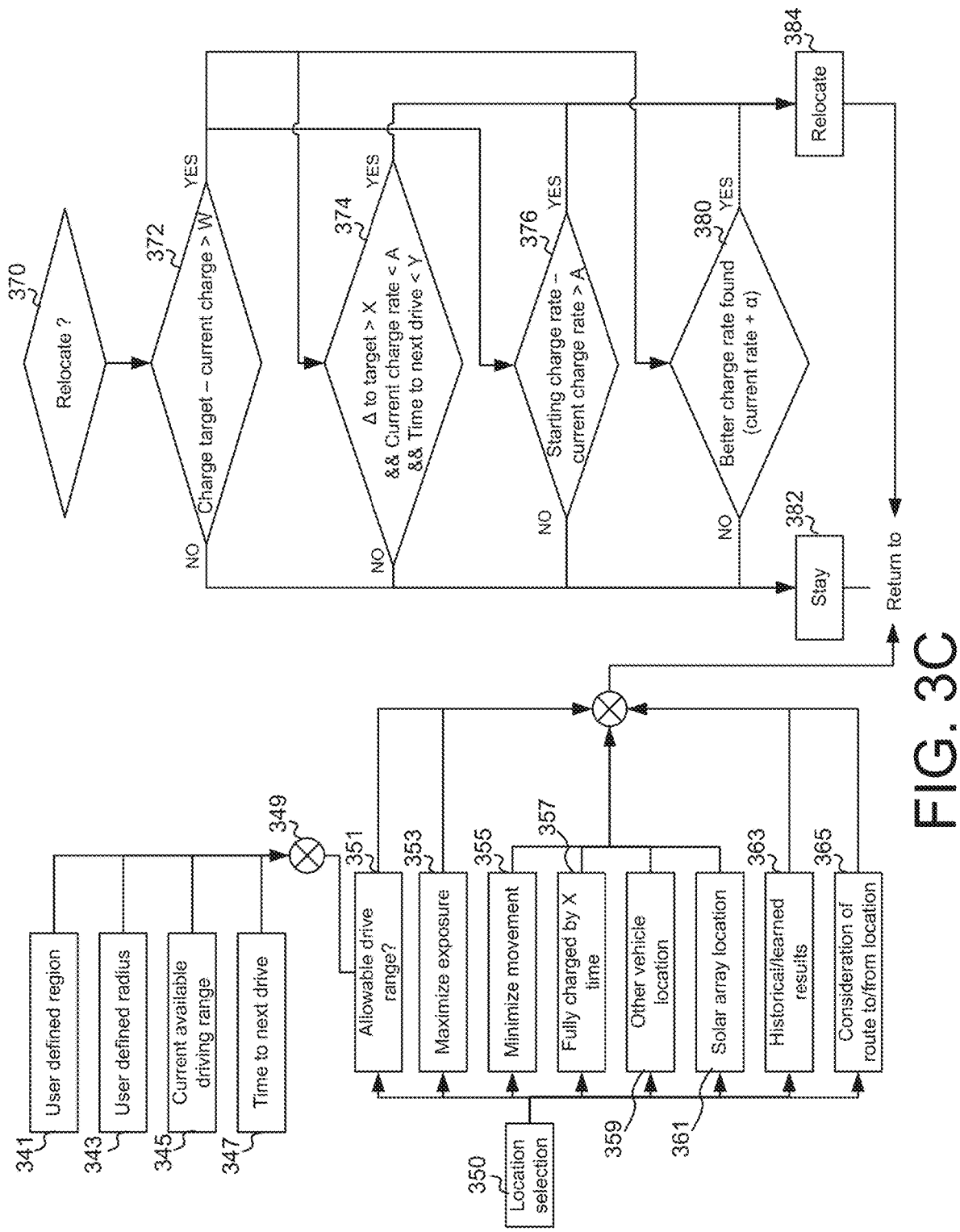
FIG. 3C is a flow chart of example operations that can be performed to determine whether or not a vehicle should be relocated and a location to which the vehicle can be relocated during the autonomous solar exposure mode of operation of FIG. 3A.

At operation 338, a current solar charging rate is compared to a threshold rate for optimal charging, A, and a time until the vehicle will be driven again is compared to the time needed to move the vehicle and return to its original parked location. If the current solar charging rate is less than the threshold, and the time until the next time the vehicle is to be driven is less than . . . , this may be considered a factor in determining where to move the vehicle. For example, the threshold rate for optimal charging may be a calibrated value based on each vehicle's solar array system and power storage device specifications/operation characteristics, as well as charging feasibility in each area (e.g., California and Seattle). Thus, this value can differ for each vehicle depending on conditions, location, operating characteristics, etc. Referring to FIG. 3C (described below), this threshold may be used to judge if the current charging rate is too low (see operation 374). It may be used again in to judge if the current charging rate has dropped during charging (see operation 376 of FIG. 3C).

Further still, at operation 340, a check is performed to determine if a current charging rate is zero, and if so, this can be considered as a factor for moving the vehicle.

At operation 342, the energy gained through moving the vehicle to a new location is compared to a current charge energy over a given period of time. It should be understood that this period of time can refer to the estimated time it would take to drive and charge at the new location. That is, a determination can be made regarding whether the driving and charging at time X results in more charge than staying at the current position with a lower charge rate for the duration of the location move and charge. If the energy to be gained by moving the vehicle to the new location is greater than what can be gained by staying in the current parked location (or remaining in its current position), this can be considered when determining where to move the vehicle.

If any one or more of the determinations performed at operations 334-342 is "negative," solar exposure circuit 102 does not enable autonomous driving control system 120. That is, the vehicle will remain in its current parked location/current position. It should be noted that the illustrated flow chart suggests that any negative determination negates enablement of autonomous driving control. However, in other embodiments (not shown), the determinations made at operations 334-342 may be weighted or may be considered differently. For example, a particular weather front may be very localized, in which case, autonomous relocation of vehicle 10 may be enabled if other positive determinations outweigh one or more negative determinations. If any of the determinations performed at operations 334-342 amount to a factor that can be considered when moving the vehicle, those factors are considered at operation 352. That is, the relevant factors can be used by solar exposure circuit 102 to determine another location(s) or position(s) to which the vehicle should be moved or repositioned, respectively. Accordingly, a judgment is made to move the vehicle at operation 382. Upon making a judgment to move or not move the vehicle, the operational flow may return to 330 (FIG. 3A).

The judgment algorithm can be summarized as an evaluation of the conditions at a current location including: current charge rate; expected solar exposure for the duration of charging to the charge target at the current charge rate; and those same conditions at locations within a pre-determined radius and communicated by other vehicles or infrastructure. If rates and solar exposure are advantageous to reaching the charge target faster than at the current location, a judgement is made to relocate, charge, and return.

FIG. 3C is a flow chart illustrating example operations detail determining a location to which a vehicle should be moved to achieve optimal solar exposure at operation 350, as well as make a relocation judgment at operation 370. Certain user inputs and/or operating constraints may be considered when determining where to move a vehicle as described above. In particular, those constraints may include a user defined region 341 and radius 343 in which the vehicle can be autonomously driven to achieve optimal solar exposure. As described above, a driver of the vehicle may specify a distance range or radius (or other constraint) within which autonomous operation of the vehicle should occur. For example, if the driver parks the vehicle in a parking structure, the driver may specify that the vehicle is to remain within some distance or proximity to the parking structure.

Another constraint may be a current available driving range 345. That is, the vehicle's power storage device may only contain enough charge to power its MG (or enough fuel to power its engine) for autonomous operation within a particular driving range. In some embodiments, as discussed above, the current parked location may be a waypoint in an overall travel route. Accordingly, navigation system 118 and solar exposure circuit 102 may determine the necessary fuel and/or battery SOC needed to reach the ultimate destination. This may be considered when determining how far the vehicle may be autonomously driven. For example, a predicted amount of charge gained through solar absorption may be calculated, and compared to the amount of energy needed to traverse a route to one or more locations for optimal solar exposure. The net result may then be compared to the overall energy needed to complete travel to the ultimate destination, and the difference can be the remaining energy left to power the vehicle while being autonomously driven to seek optimal solar exposure. Another constraint, as discussed above, may be the time 347 between when the vehicle is parked and when the vehicle will be needed again by the driver/passenger. This can include the time needed to travel to one or more new locations for optimal solar exposure as well as the time needed to return to the vehicle's original parking location. In some embodiments, the driver or passenger may specify that the vehicle need not be returned to its original location, but can be left within some distance from the original parking location.

Regarding location selection at operation 350, other considerations are taken into account. For example, the previously-described constraints can be considered in conjunction with an allowed autonomous driving range 351. Other considerations may include maximizing solar exposure 353, minimizing movement 355 (to reduce energy consumption), the time needed to fully charge the vehicle power storage device 357, and locations specified or shared by other vehicles 359. In some embodiments, in addition to V2V communications, these other locations where optimal solar exposure may be achieved may be obtained through crowd-sourcing information repositories or services. Still other considerations can include solar farms/array locations 361, historical locations learned over time 363, and operating/road/environmental considerations associated with traversing a route to and from a location 365. For example, the energy that may be consumed and/or gained by traveling to and returning from a location and exposing the solar panel of the vehicle to the sun can be considered. Road features, such as a uphill/downhill sections where additional energy may be needed or expended, or recouped through regenerative braking may also be considered.

Search circuit 114 may obtain or receive one or more of these considerations as inputs in determining a location(s) to which the vehicle should be moved to achieve optimal solar exposure. It should be understood that the same or similar considerations may be taken into account when repositioning the vehicle as well. For example, it may be determined by search circuit 114 that a particular location will provide the optimal solar exposure, and that the vehicle needs to be positioned (e.g., turned, tilted, angled, etc.) in a particular way. It should also be understood that not all of these considerations are necessarily needed when determining a location to which the vehicle should be moved and/or relocated. For example, the vehicle may not have access to a learning database containing information regarding historical, learned locations, or a route may not come across a solar array location. After determining one or more locations or positions, the method may return to location selection operation 350, where one or more locations (or positions) are now available as potential locations (or positions) to which the vehicle may travel or be repositioned.

Regarding the relocation judgment 370, a current charge/SOC may be subtracted from a current charge target and compared to the minimum solar charging rate threshold, W. If the comparison is such that the net charge is greater than the minimum solar charging rate threshold, another determination is made at operation 372. At operation 372, the delta to target is compared to the minimum solar charging rate threshold, the current charge rate is compared to the threshold rate for optimal charging, A, and the time until the next use of the vehicle is compared to Y. If the delta to target is greater than W, the current charging rate is less than A, and the time until the vehicle is to be next used is less than Y, a judgment is made to relocate the vehicle at operation 384. It should be noted that the delta to target calculation is performed in order to calibrate the amount of charge gap present to decide if moving for solar charging is realistically possible or not. That is, if a minimal amount of charge (e.g., 5%) would be needed to fully charge the vehicle (SOC currently at 95%), moving the vehicle to reach a fully charged SOC or 100% is not likely worth the expenditure in energy to relocate the vehicle. Likewise, if the current SOC is, e.g., 10%, a judgment would likely be made to relocate the vehicle to leverage available solar charging opportunities. Thus, such calculations can be performed to calibrate the value to judge whether or not a move/relocation is warranted or not.

Moreover, another determination may be made at operation 376, where the current charging rate is subtracted from the starting charging rate and compared to A. If the result is less than A, again, a judgment is made to relocate the vehicle. Further still, at operation 380, if a better charging rate is found (predicted) at another location given one or more of the aforementioned conditions, e.g., weather, road conditions, traffic conditions, etc., again, a judgment to relocate the vehicle to a new location (determined at operation 350) is made. It should be noted that determining whether a better charging rate exists at another location is a function of a current charging rate and a threshold, a, reflecting the benefit of relocation. This threshold can be a calibrated value that would help determine if the charge gap could be filled or satisfied more effectively with a faster charge rate (as a result of relocation). If the current SOC is 80% or more, for example, any potential benefit to moving may be limited. However, an SOC of 10% or more, for example, should influence the decision to move.

After making a judgment as to whether or not the vehicle should be relocated to a new location (or repositioned), the judgment decision may be used at operation 370 (FIG. 3A) to proceed with relocating the vehicle or remaining in its current parked location.

Figure 4:
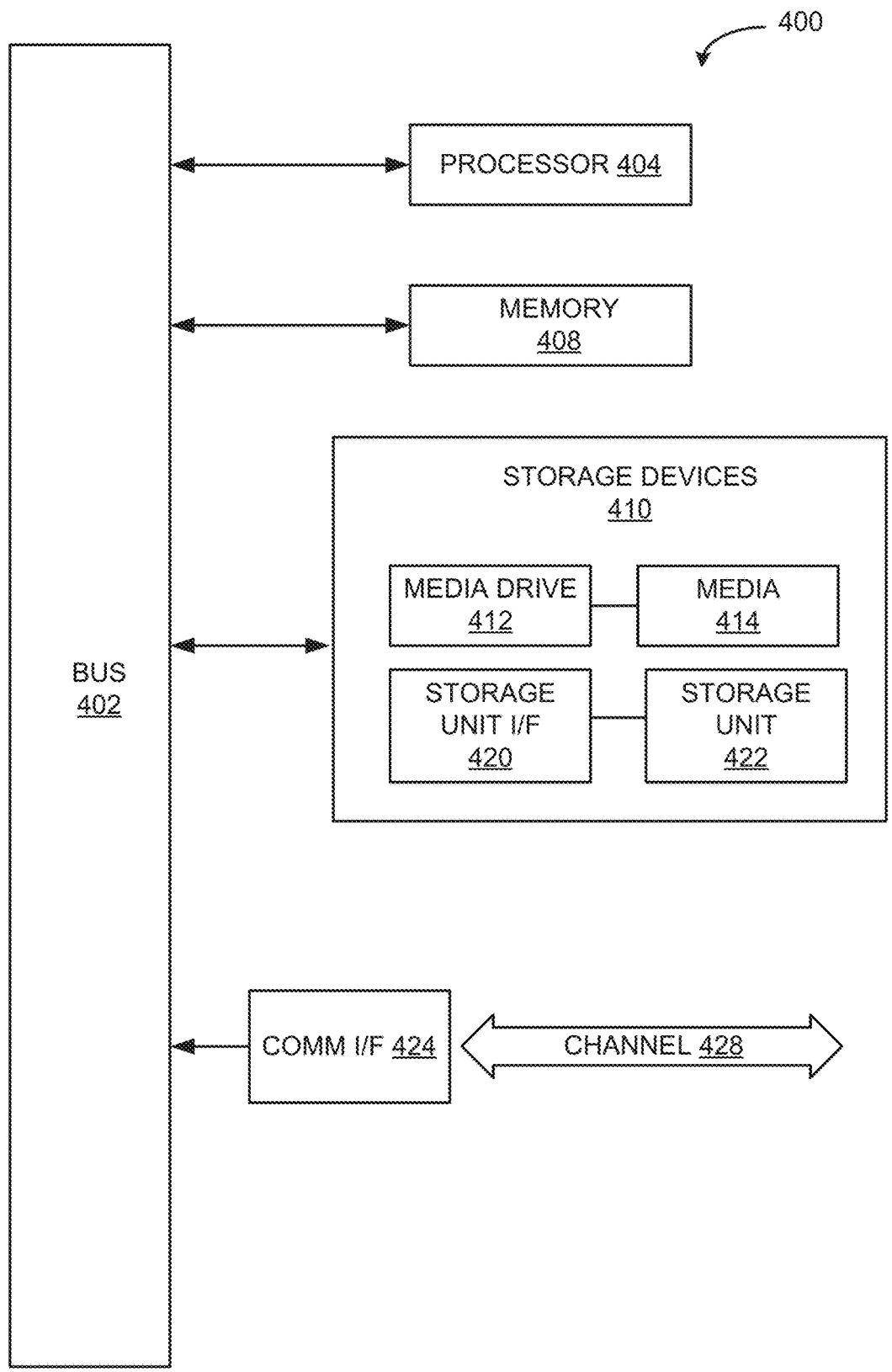
FIG. 4 illustrates an example computing system that may be used in implementing various features of embodiments of the disclosed technology.

As used herein, a circuit (or component) might be implemented utilizing any form of hardware, software, or a combination thereof. For example, one or more processors, controllers, ASICs, PLAs, PALs, CPLDs, FPGAs, logical elements, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 4. Various embodiments are described in terms of this example-computing system 400. After reading this description, it will become apparent to a person skilled in the relevant art how to implement the technology using other computing systems or architectures.

Referring now to FIG. 4, computing system 400 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing system 400 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 400 might include, for example, one or more processors, controllers, control modules, or other processing devices, such as a processor 404. Processor 404 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 404 is connected to a bus 402, although any communication medium can be used to facilitate interaction with other components of computing system 400 or to communicate externally.

Computing system 400 might also include one or more memory modules, simply referred to herein as main memory 408. For example, in some embodiments random access memory (RAM) or other dynamic memory, might be used for storing information and instructions to be executed by processor 404. Main memory 408 might also be used for storing temporary variables or other intermediate information during execution of instructions to be executed by processor 404. Computing system 400 might likewise include a read only memory ("ROM") or other static storage device coupled to bus 402 for storing static information and instructions for processor 404.

The computing system 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), a flash drive, or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing system 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a flash drive and associated slot (for example, a USB drive), a PCMCIA slot and card, and other fixed or removable storage units 422 and interfaces 420 that allow software and data to be transferred from the storage unit 422 to computing system 400.

Computing system 400 might also include a communications interface 424. Communications interface 424 might be used to allow software and data to be transferred between computing system 400 and external devices. Examples of communications interface 424 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 400 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
   determining whether a vehicle is in a parked state;
   upon a determination that the vehicle is in the parked state, determining a first location of the vehicle;
   measuring the vehicle's power storage device state of charge;
   determining within a range of operation relative to the first location, solar exposure that can be used by a solar panel of the vehicle to recharge the vehicle's power storage device to a desired state of charge relative to the measured power storage device state of charge;
   enabling an autonomous driving mode of the vehicle and autonomously operating the vehicle to travel to one or more locations at which the solar exposure meets energy requirements for recharging the vehicle's power storage device to the desired SOC;
   automatically parking the vehicle for a determined time period to recharge the vehicle's power storage device to the desired SOC; and
   returning the vehicle to the first location.

2. The computer-implemented method of claim 1, wherein the range of operation relative to the first location comprises a maximum, radial distance from the first location that the vehicle is allowed to be autonomously operated.

3. The computer-implemented method of claim 2, wherein the maximum, radial distance from the first location that the vehicle is allowed to be autonomously operated is user defined.

4. The computer-implemented method of claim 1, wherein the range of operation relative to the first location comprises a distance the vehicle is capable of being autonomously operated based on the vehicle's power storage device current state of charge.

5. The computer-implemented method of claim 1, wherein the range of operation relative to the first location is limited by an amount of time needed by the vehicle to travel to the one or more locations and return from the one or more locations to the first location.

6. The method of claim 5, wherein the amount of time needed by the vehicle to travel to the one or more locations and return from the one or more locations to the first location is less than a period of time ending when an operator or passenger of the vehicle is to return to operate the vehicle.

7. The computer-implemented method of claim 1, further comprising selecting the one or more locations based on locations at which the vehicle can be automatically parked to optimize the solar exposure needed to meet the energy requirements for recharging the vehicle's power storage device to the desired SOC while minimizing the energy required to travel to the one or more locations, and return from the one or more locations to the first location.

8. The computer-implemented method of claim 7, wherein the one or more locations are selected from a group of locations comprising at least one of a location identified by other vehicles as potentially meeting the energy requirements for recharging the vehicle's power storage device to the desired SOC through solar exposure, a solar array location potentially meeting the energy requirements for recharging the vehicle's power storage device to the desired SOC through solar exposure, and a location historically identified as potentially meeting the energy requirements for recharging the vehicle's power storage device to the desired SOC through solar exposure.

9. The computer-implemented method of claim 7, wherein the one or more locations are selected from a group of locations comprising locations where energy expended by the vehicle in traveling to and returning from the locations is less than the energy requirements for recharging the vehicle's power storage device to the desired SOC through solar exposure.

10. The computer-implemented method of claim 1, further comprising determining whether to relocate the vehicle to another location from the one or more locations.

11. The computer-implemented method of claim 10, wherein determining whether to relocate the vehicle to the other location from the one or more locations comprises determining whether a solar absorption rate at the one or more locations falls below an expected threshold.

12. The computer-implemented method of claim 1, further comprising repositioning the vehicle to maximize exposure of the vehicle's solar panel to a solar energy source.

13. The computer-implemented method of claim 12, wherein the repositioning of the vehicle comprises orienting the vehicle on a road grade to achieve an angular position relative to the solar energy source.

14. A system, comprising:
   one or more sensors adapted to determine one or more operating conditions of a vehicle;
   a solar panel implemented on a roof of the vehicle; and
   a solar exposure circuit adapted to determine a subsequent location to which the vehicle should be autonomously moved, relocated, or repositioned from an original location at which the vehicle is parked to expose the solar panel to a solar energy source such that energy is absorbed from the solar energy source at a rate and in an amount sufficient to charge a power storage device of the vehicle to a desired state of charge.

15. The system of claim 14, further comprising a navigation system operatively connected to the solar exposure circuit, the navigation system determining a route the vehicle should travel upon being autonomously moved or relocated to the subsequent location.

16. The system of claim 15, wherein the solar exposure circuit determines the subsequent location based on one or more characteristics of the route and an amount of energy the vehicle will expend upon being autonomously moved or relocated to the subsequent location, such that a net amount of energy resulting from the exposure to the solar energy source and the amount of energy the vehicle will expend meets the amount sufficient to charge the power storage device of the vehicle to the desired state of charge.

17. The system of claim 16, wherein the one more characteristics of the route comprise a radial distance from the original location that meets a user-input distance constraint.

18. The system of claim 16, wherein the one or more characteristics of the route comprise predicted weather conditions along the route.

19. The system of claim 16, wherein the one or more characteristics of the route comprise at least one known solar array being present on the route.

20. The system of claim 16, wherein the one or more characteristics of the route comprise historical identification of at least one portion of the route as having features or conditions conducive to providing the energy that when absorbed from the solar energy source is absorbed at a rate and in an amount sufficient to charge the power storage device of the vehicle to the desired state of charge.

\* \* \* \* \*